June 10, 1941.   J. DELMONTE   2,245,433
ELECTRIC MOTOR AND METHOD OF MAKING THE SAME
Filed Oct. 13, 1939   2 Sheets-Sheet 2
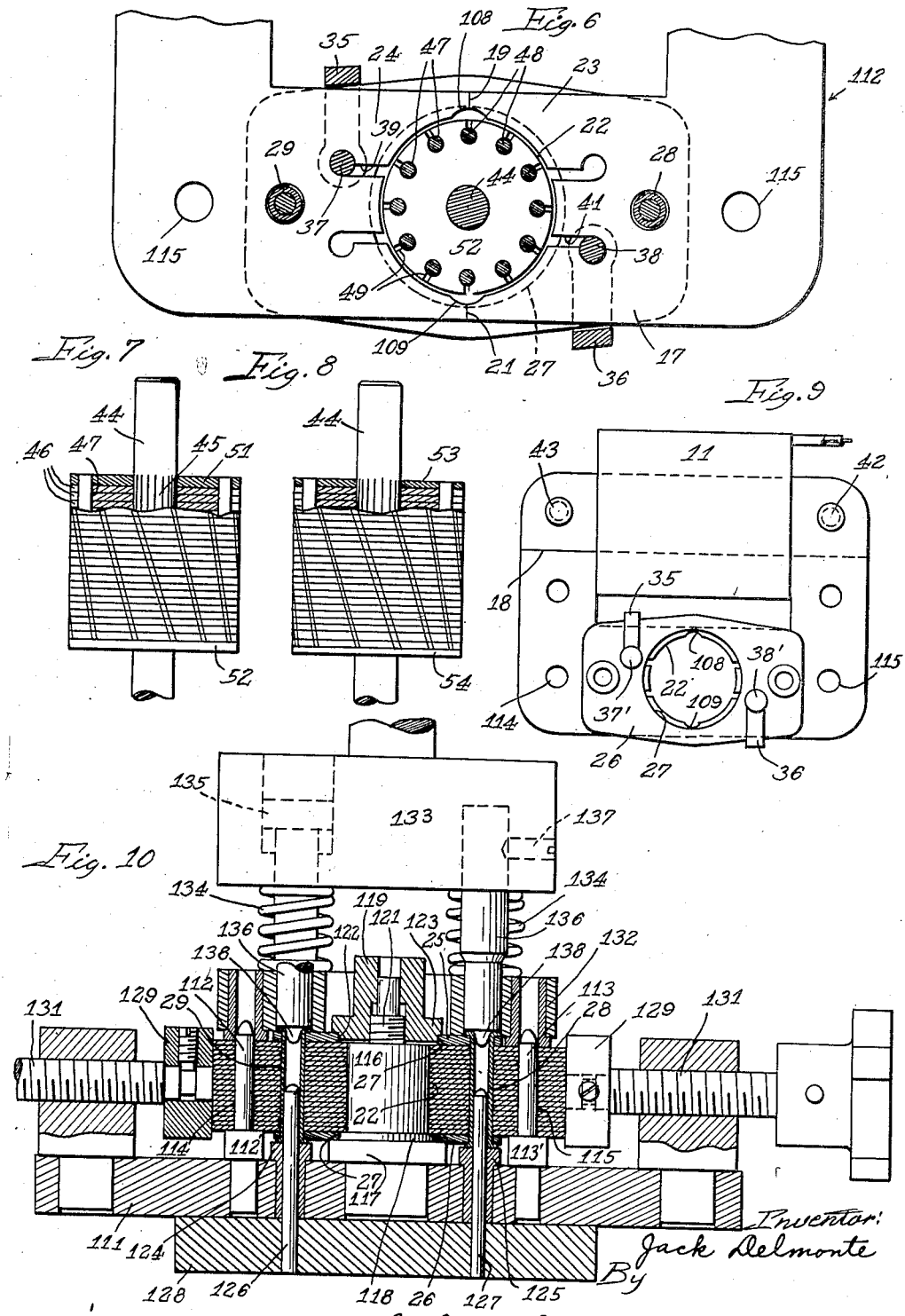

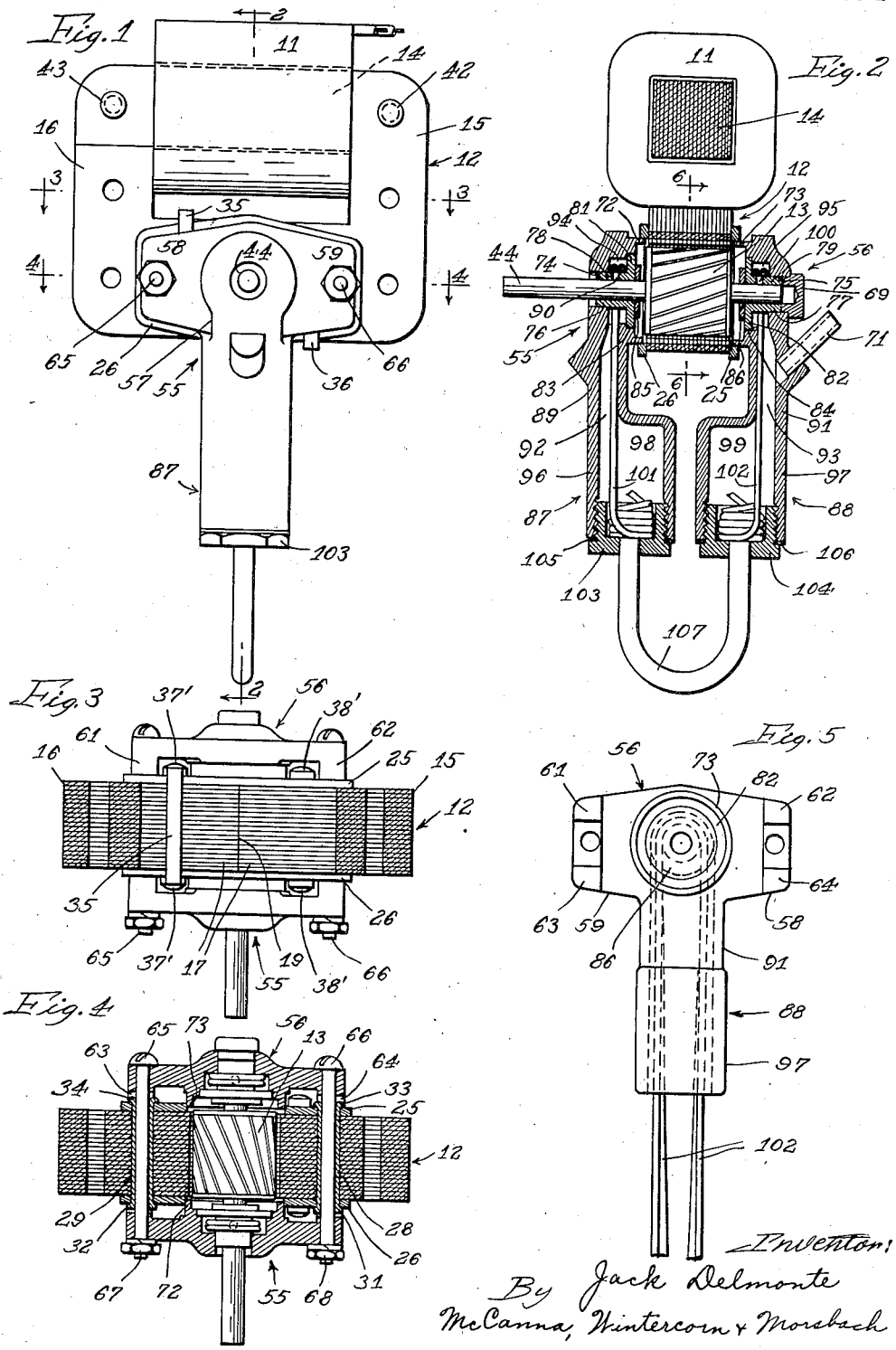

Patented June 10, 1941

2,245,433

UNITED STATES PATENT OFFICE 2,245,433

ELECTRIC MOTOR AND METHOD OF MAKING THE SAME

Jack Delmonte, Park Ridge, Ill., assignor to Chicago Flexible Shaft Company, Chicago, Ill., a corporation of Illinois Application October 13, 1939, Serial No. 299,246

4 Claims. (Cl. 172—36)

This invention relates to motors and has special reference to an alternating current induction motor of improved structure and operating characteristics, and to a method of making the same.

An object of the invention is the provision of a generally improved motor of the class described.

Another object of the invention is the provision of a motor of the class described having improved structural characteristics for obtaining precise alignment of the rotor with respect to the field poles and the rotor bearings.

I have also aimed to provide a motor having improved bearings, and means for locating the bearings on the motor.

A further object of the invention is the provision of improved means for lubricating the rotor bearings.

Another object of the invention is the provision in a motor of the class described of an improved design in the field laminations to produce greater torque in the motor.

A still further object of the invention is the provision of improved methods for making a motor of the class described, whereby the commercial production thereof is facilitated and cheapened, and improved operating characteristics are produced.

Other objects and advantages will appear from the following description and the accompanying drawings, in which—

Fig. 1 is a side view of a motor embodying my invention;

Fig. 2 is a section on the line 2—2 of Figure 1;

Fig. 3 is a section on the line 3—3 of Figure 1;

Fig. 4 is a section on the line 4—4 of Figure 1;

Fig. 5 is a side elevation of one of the bearing members;

Fig. 6 is a section on the line 6—6 of Fig. 2;

Figs. 7 and 8 are elevations, partly in section, showing two different forms of rotors;

Fig. 9 is a side elevation of the field laminations, the coil and the locating plate, prior to the assembly thereon of the bearing members and rotor, and Fig. 10 is a sectional view through the field laminations and through a fixture showing the manner in which the field laminations are assembled.

The motor herein disclosed is of the induction type having a squirrel-cage armature and short circuited armature conductors, a rotating magnetic field being produced in the conventional manner through the use of shaded poles, the function of which is to delay the magnetic flux in that part of the magnetic circuit embraced by the shading rings, thereby producing a shifting magnetic field with respect to the unshaded poles across the rotor conductors and inducing currents which function to produce rotation of the rotor. The motor includes structures which functions to facilitate the aligning of the rotor and the rotor bearings, at least a part of which structure is not strictly limited to this particular type of motor but may have broader application.

Directing attention now to the drawings, the numeral 11 designates generally the main motor winding, the numeral 12 the field laminations, and the numeral 13 the rotor of the motor. The field coil is of the usual construction and serves to receive one side 14 of the field laminations 12, the latter of which are in the form of a rectangle having the side 14, ends 15 and 16 and a side 17 (Fig. 6) which latter side forms the poles of the motor in accordance with the usual practice. Each of the laminations is made up of two pieces, one of the pieces including the side 14, one end, and half of the side 17, whereas the other piece includes half of the side 17 and the other of the ends, the pieces abutting as shown at 18 in Fig. 9 and 19 and 21 in Fig. 6. The laminations are alternated in the usual way so that each succeeding lamination overlies the abutting line 18 so as to produce a rigid core with parting lines therethrough at 19 and 21. The side 17 of the core has an opening 22 cylindrical in shape and slightly larger than the rotor, the opening being placed midway between the ends of the side 17 and forming pole pieces 23 and 24. Secured to opposite faces of the core are locating plates 25 and 26, which plates are each provided with a circular opening 27 which is concentric with the rotor opening 22, and in this instance of slightly larger diameter, as shown in Fig. 9. These plates are secured against the opposite faces of the core by means of hollow rivets 28 and 29 having pre-formed heads 31 and 32 and heads 33 and 34 splayed over in the riveting process. These rivets 28 and 29 serve to hold the locating plates 25 and 26 in parallel relationship, and also with the openings 27 in concentric relationship with the rotor opening 22 after said plates and the laminations have been aligned by reason of the special alignment features of the assembly fixture. These rivets also serve to hold the laminations tightly together with the abutting ends along the parting lines 19 and 21 into firm abutting relationship, these parts being assembled in a manner presently to be described. Positioned on the side 17 adjacent opposite sides thereof are shading rings 35 and 36 in the form of copper straps extending along the faces of the portion 17 and across the edge thereof, the ends of the straps being interconnected by pins 37 and 38 which are soldered at 37' and 38' to said ends of said straps. Said pins extend through openings 39 and 41 in the core, which openings terminate in the rotor opening 22 as shown in Fig. 6, these shading coils performing the well known function of delaying the magnetic flux by setting up an opposing field due to currents induced in the shading coil, as is well known in the art. The laminations in the core are also held together by means of rivets 42 and 43 (Figs. 1 and 9).

The rotor, best shown in Figs. 7 and 8, includes a central shaft 44 having a knurled portion 45 for the purpose of securing thereto a plurality of laminations as shown at 46. All of these laminations with the exception of the end plates are formed of the usual silicon steel or other suitable material provided with a plurality of longitudinally extending holes, as shown at 47 (Fig. 6), for the reception of copper conductors 48, the rotor being provided with slots as shown at 49 extending from the periphery of the rotor into the openings 47. The ends of the conductors 48 are seated in copper end plates 51 and 52 or 53 and 54, as shown in Fig. 8, the only difference in Figs. 7 and 8 being in the thickness of the end plates, these end plates serving to short circuit the conductors 48. I have found that I can effectively alter the speed performance of the motor by increasing or decreasing either the number of copper laminations stacked with the silicon steel laminations or by changing the thickness of the end plates; in other words, the amount of copper in the short circuiting medium. Thus, by making the end plates relatively thick, as shown in Fig. 7, the motor is caused to run at one speed, whereas by decreasing the thickness of the end plates as shown in Fig. 8, the speed of the motor may be materially decreased. In other words, by providing in the assembly of the end plate 52 more or less copper, I am able to control the speed of the motor. Thus, by increasing the gauge thickness of the end plates from .018 to .025, for example, the speed is increased by about 100 R. P. M. A possible explanation for the fact that the speed of the motor can be controlled by the thickness of the end laminations is in the fact that this copper serves as a short circuiting medium for the currents induced in the conductors, and consequently, a reduction of impedance, as by using more copper, permits greater circulating currents, higher speeds, and greater torque. Another result achieved by this construction is that the motor is a constant speed motor for varying voltages when operated on current of 40 cycles.

The rotor 13 is supported in the rotor opening 22 by means of bearings designated generally by the numerals 55 and 56 adapted to receive the shaft 44 at opposite sides of the rotor laminations, as best shown in Figs. 2 and 4. These bearings in this instance include a plate-like bearing bracket 57 (Figure 1) having laterally projecting ears 58 and 59 and upper feet 61 and 62 and lower feet 63 and 64, adapted to seat against the locating plates 25 and 26. Intermediate the feet are bolts 65 and 66 which pass through the brackets 57 and through the tubular rivets 28 and 29 as shown in Fig. 4, the ends of the bolts having nuts 67 and 68 for tightening the bearings against the locating plates. The bearings are identical in construction with the exception that the bearing 56 has a cap 69 covering the end of the shaft 44, and a tube 71 for supplying lubricant to the bearings, as will presently be described. Each of the brackets 57 also has a cylindrical boss as shown at 72 and 73, these bosses being received within the openings 27 of the locating plates, and being shaped for reception therein within very close tolerances whereby to locate the bearings with respect to the rotor opening 22. The bearings are provided with openings 74 and 75 adapted to receive the hub portions 76 and 77 of bearing elements 78 and 79, which elements are formed of so-called oilless bearing metal and have circular flanges 81 and 82 receivable in recesses 83 and 84 within the bosses 72 and 73, the bearing members and complemental elements being shaped to fit within close tolerances so as to accurately locate the bearing elements. The bearing elements 78 and 79 are provided with holes 98 and 100 for the purpose of transmitting lubricant to the interface between the shaft 44 and the bearing elements. Positioned on the shaft 44 between the laminations and the bearing elements 78 and 79 are washers 85 and 86, in this instance of micarta or similar reinforced synthetic resin.

Integral with the bearing housings 55 and 56 are lubricant reservoirs designated generally by the numerals 87 and 88, these reservoirs including flat tubular portions 89 and 91 connected with the plates 57 and having central openings 92 and 93 communicating with chambers 94 and 95, which chambers surround the hub portions 78 and 79 of the bearing elements. The portions 89 and 91 have tubular reservoir portions 96 and 97 at their bottom ends provided with chambers 98 and 99 communicating with the central openings 92 and 93. Positioned within the chambers 98 and 99, the openings 92 and 93 and the chambers 94 and 95 are woolen cords 101 and 102 which are given several turns about the bearing elements 78 and 79, the ends of the cords depending through the openings 92 and 93 and into the chambers 98 and 99, being of such length as to normally depend beyond the chambers, as shown in Fig. 5, the ends thereof being stuffed back into this chamber during the process of assembly. The lower ends of the chambers 98 and 99 are closed by means of screw plugs 103 and 104 which engage threads in the bottom ends of the cylindrical portions 96 and 97 and are sealed by means of lead washers 105 and 106 or otherwise, as may be convenient. The plugs 103 and 104 are provided with central openings into which are seated the ends of a U-shaped tube 107, the tube being sweat or soldered into the plugs to provide a fluid-tight connection. The tube 107 permits of communication between the chambers 98 and 99. The bearing 56 has a tube 71 secured in the side thereof, the interior of which communicates with the opening 93 and the chamber 99, the tube serving to supply lubricant to this chamber. It will be seen that through this means the chambers 98 and 99, together with the tube 107, can be substantially filled with lubricant which will be transmitted up to the bearing elements 78 and 79 by the cords 101 and 102 which serve as wicks to elevate the lubricant in a capillary action. Obviously, the lubricant is a relatively thin oil which will be readily moved by capillary action.

In order to facilitate the assembly, and as a result of my improved method of manufacture, the laminations are caused to abut along the lines 19 and 21, and I have also found that this produces improved operating characteristics. One of the important considerations in determining the operating characteristics of a shaded pole induction motor is the nature of the magnetic circuit where the field laminations abut together. Where the field laminations are in abutment in the region which divides the shaded and unshaded poles into two halves, I have found that there is a loss of power if there is an appreciable gap between the ends of the field laminations. I have also found that merely providing close abutment of the ends of the field laminations, while desirable to a motor of the construction as here provided, would require other expedients to give improved performance. My invention, therefore, provides for removing a portion of the inside periphery of the field laminations, as shown at 108 and 109 (Fig. 6), whereby I am able to increase very appreciably the starting torque. It appears that an optimum cut-away portion of the pole tip is at about $\frac{5}{32}$" which is approximately 12.5% of the total circumference of the rotor, considering both cut-away portions. It appears that with only a portion of the field laminations in abutment at the median plane of the rotor, there is an optimum portion of the poles following the rotor periphery, and this appears to give improved performance. I have found that with induction motors of the type herein shown, a wide gap between the ends of the laminations at the median plane (corresponding to a salient pole construction) reduces the iron in the magnetic path and thereafter increases the magnetic impedance. This means that the total flux through the magnetic circuit is reduced and to that extent the forces on the conductors of the rotor are reduced even though a greater proportion of flux passes through the rotor. On the other hand, a pole tip extended from one side to the other by-passes so much of the magnetic flux that a relatively small proportion threads through the rotor, which is undesirable because as much magnetic flux as possible must be carried through the rotor for best performance. I have found that while pole tip extensions are necessary to keep the magnetic impedance to a low value, a discontinuation of the pole tip extension by increasing the air gap between the rotor and the laminations, causes a greater proportion of flux to enter the rotor because the magnetic path of the pole extension is already saturated. This produces greater torque in the motor.

The invention also contemplates an improved method for making the motor, the steps of which are illustrated in Fig. 10. According to this method, the laminations are inserted through the coil 11 and stacked one upon the other in a fixture, this fixture including a plate 111, which plate has upstanding pins 112 and 113 adapted to be received in openings 114 and 115 of the laminations for the purpose of holding the same in stacked relation during the initial stages of the assembly. The pins 112 and 113 have collars 112' and 113' which support the plates in spaced relation to the plate 111 and also provide clearance for the coil into which the laminations are assembled. The plate 111 also has an upstanding boss 116 which has an outer circumference equivalent to that of the rotor opening 22. This boss has a shoulder 117 and a shoulder 118 of somewhat smaller diameter, the diameter of the shoulder 118 being the same as that of the opening 27 in the locating plates 25 and 26, the difference between these two dimensions being the minimum allowable for clearance. In assembling, one of the locating plates, in this instance the plate 26, is first seated on the collar 117 and over the collar 118, and thereafter the laminations are stacked thereon in alternate fashion with the pins 112 and 113 passing into the openings 114 and 115 until the requisite number of laminations are thus located, or the laminations may be stacked in another fixture and placed as a stack in the position here described. Thereafter the locating plate 25 is seated on the top of the stack of laminations. A nut 119 is then screwed onto a threaded upper portion 121 of the boss 116 and drawn down, the nut 119 having a locating portion 122 adapted to be received within the opening of the plate 25 to locate this opening with respect to the axis of the boss 116. The nut also has a shoulder 123 adapted to engage the upper face of the plate 25, whereby to urge the plate downward and thus confine the laminations and compress the same. Hollow rivets 28 and 29 are inserted through the openings provided therefor, the rivets being slightly smaller than the openings in the laminations, the lower ends of these rivets seating on anvils 124 and 125 supported in the plate 111. The rivets are held in position by means of pins 126 and 127 carried on a locating plate 128 and are inserted by the act of placing the stack of laminations in the fixture. The next operation is to press abutment blocks 129 inwardly against the opposite ends of the laminations to cause the edges of the laminations facing the rotor opening uniformly seat them against the central boss 116 and thereby provide an accurately formed and located rotor opening. The blocks 129 may be pressed in by any suitable means such as hand screws 131. Simultaneously the abutting ends of the laminations will be brought into contact along the lines 19 and 21. Thereafter the nut 119 is screwed tightly down so as to press the laminations together. The device is then operated upon by a die portion 132 adapted to be centered on the work by means of the pins 112 and 113, the die portion 132 being resiliently mounted on a die head 133 by means of springs 134, the portion 132 having reciprocating movement in the die head 133, as has the guide member 135. The die head 133 also carries die members 136 secured therein by means of set screws 137, the lower ends of the die members 136 having conventional riveting surfaces 138 which engage the upper ends of the rivets 28 and 29 and splay them over against the upper surface of the locating plate 25, the rivets thus securing the laminations and the locating plates rigidly together in fixed relation so that the rotor opening 22 is truly cylindrical and the openings 27 of the locating plates are truly concentric with the axes of the rotor opening.

It will be seen that by employing this method of assembling the stator, it is possible without tedious adjustment or extreme care on the part of the operator to make the rotor opening cylindrical within a relatively high degree of accuracy and to maintain the same dimensions of the rotor opening. It is likewise possible to bring the openings 27 of the locating plates into substantially true concentricity with the rotor opening. As a result it is necessary in making the remainder of the motor to merely turn the rotor laminations to true concentricity with the shaft 44, which, of course, is easily done by the usual machining methods, and, likewise, to finish the bosses 72 and 73 by turning operations coaxial with the bearing openings of the respective bearing housings and drill the required openings in the bearing housings in order to assure perfect alignment of the bearings when the bearing housings are seated against the locating plates. It will be observed that the end surfaces of the feet 61, 62, 63 and 64 of each bearing housing are accurately finished in a common plane perpendicular to the axis of the annular locating boss of such housing so that when these end surfaces rest against the adjacent locating plate they lie in a plane exactly perpendicular to the bearing axis. The bearing openings, it will be seen, are brought into coaxial relationship because of the feet 161 and 164 bearing directly against the faces of the locating plates, which, during the assembling operations, are brought into parallel relationship.

It will be further observed that with this construction I am able to provide, with simple production methods, a uniform and accurately controlled air gap between the armature and the poles. This construction entirely obviates the usual tedious procedure of adjustment and approximation heretofore required in aligning the bearings and in adjusting the air gap between the rotor and the poles of the field magnet. In the past the usual technique has been to allow relatively liberal tolerances and to tap the bearing brackets until quiet operation is obtained. It will be seen that new results follow from my improved method of manufacture and that relatively small tolerance allowances are made and the parts readily fit into the desired alignment and coaxial relationship.

Attention is also directed to the fact that the oil reservoirs for each bearing are formed integral with the bearing, and that a U tube joins the two reservoirs, thereby permitting oil to be fed from a single opening outside the motor, which eliminates the necessity for oiling at both bearings. Furthermore, these oil reservoirs are located below the level of the bearing, and the oil is fed to the bearing by capillary action. This permits a large supply of oil to be carried in the reservoirs sufficient to lubricate the motor for prolonged periods of operation. Another advantage of my construction lies in the fact that I can control the speed of the motor by varying the thickness of the copper end plates on the rotor, which thus offers a convenient method of controlling the speed when large numbers of motors are manufactured.

It will be understood that the present showing is by way of illustration and not limitation, and I do not, therefore, desire to be limited except as required by the prior art and the scope of the appended claims, in which I claim:

1. The combination in an electric motor, of a laminated field core having a cylindrical rotor opening therein, means passing through the laminations and fixedly retaining them with their rotor openings in fixed relative relation conforming to a true cylinder, a locating plate held fixed against each outermost lamination in a plane perpendicular to the axis of said rotor opening and having a cylindrical locating opening set with precision in concentric relation to said rotor opening, a rotor in said opening, a bearing for each end of the rotor, a supporting member for each bearing having a cylindrical locating surface finished with precision in concentric relation to and co-axial with its bearing axis and adapted to have precision fit in the cylindrical opening of the adjacent locating plate and having additional locating surfaces in a plane perpendicular to said bearing axis adapted to seat against the outer face of said adjacent locating plate to locate its bearing in axial alignment with said rotor opening, and bolts passing through the fixed laminations and the supporting members and having means for fixedly clamping the bearing supporting members to the locating plates in the positions established by said locating surfaces, whereby to accurately establish a uniform air gap between the rotor and the pole faces at the interior of the rotor opening and whereby the clamping bolts and the supporting members are removable from the laminations independently of and without disturbing the fixed relation of the first mentioned means and the laminations.

2. The combination in an electric motor, of a laminated field core having a cylindrical rotor opening therein, hollow rivets retaining the laminations with their rotor openings in fixed relative relation conforming to a true cylinder, a locating plate positioned against each outermost lamination in a plane at right angles to the axis of said rotor opening and having a cylindrical locating opening set with precision in concentric relation to said rotor opening and held fixed in said position by said hollow rivets, a rotor in said opening, a bearing for each end of the rotor, a supporting member for each bearing having a cylindrical locating surface finished with precision in concentric relation to and co-axial with its bearing and adapted to have precision fit in the cylindrical opening of the adjacent locating plate and having additional locating surfaces adapted to seat against the outer face of said adjacent locating plate to maintain its bearing in axial alignment with said rotor opening, and bolts passing through said hollow rivets for fixedly securing the bearing supporting members in the positions established by said locating surfaces, whereby to accurately establish a uniform air gap between the rotor and the pole faces at the interior of the rotor opening.

3. The combination in an electric motor, of a field core composed of stamped laminations each having a cylindrical rotor opening, a locating plate for each end of the field core of metal heavier than said laminations and having a cylindrical rotor opening, hollow rivets fixedly securing the locating plates and the laminations in assembled relation with the cylindrical openings the laminations and locating plates accurately positioned in concentric relation, a rotor, a bearing for each end of the rotor, a supporting member for each bearing having a cylindrical locating surface finished with precision in concentric relation to and co-axially with its bearing and adapted to have precision fit in the cylindrical opening in the adjacent locating plate and further shaped to seat against the outer face of said locating plate to maintain its bearing in axial alignment with the rotor opening, and means passing through the hollow rivets and coacting with the supporting members to fixedly clamp the parts in the relation described.

4. A shaded two-pole induction motor having a cylindrical rotor, a field core shaped to provide an opening for the rotor, the field core having separate pole pieces in abutting relation in a diametrical plane, said opening being of cylindrical shape and providing constant radial air gap over the greatest part of the circumference and having two zones of increased radial air gap distinct from said constant radial air gap, said zones being located at diametrically opposite parts of the field and in a plane substantially perpendicular to the field axis, said zones combined covering approximately one-eighth of the circumference of the field opening.

JACK DELMONTE.